US010002019B2

(12) United States Patent
Amundsen et al.

(10) Patent No.: US 10,002,019 B2
(45) Date of Patent: Jun. 19, 2018

(54) SYSTEM AND METHOD FOR ASSIGNING A TRANSACTION TO A SERIALIZED EXECUTION GROUP BASED ON AN EXECUTION GROUP LIMIT FOR PARALLEL PROCESSING WITH OTHER EXECUTION GROUPS

(75) Inventors: Lance C. Amundsen, San Mateo, CA (US); Harold H. Hall, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1609 days.

(21) Appl. No.: 12/463,907

(22) Filed: May 11, 2009

(65) Prior Publication Data

US 2010/0287554 A1 Nov. 11, 2010

(51) Int. Cl.
G06F 9/46 (2006.01)
G06F 9/50 (2006.01)

(52) U.S. Cl.
CPC ............ *G06F 9/466* (2013.01); *G06F 9/5038* (2013.01)

(58) Field of Classification Search
CPC ............................. G06F 9/466; G06F 9/5038
USPC .......... 707/607, 703; 709/206; 718/101, 102
See application file for complete search history.

(56) References Cited

U.S. PATENT DOCUMENTS

| | | | |
|---|---|---|---|
| 6,219,689 B1 | 4/2001 | Mori | |
| 6,622,217 B2 | 9/2003 | Gharachorloo et al. | |
| 6,971,096 B1 | 11/2005 | Ankireddipally et al. | |
| 7,028,297 B2 * | 4/2006 | Horn et al. | 718/100 |
| 7,190,681 B1 | 3/2007 | Wu | |
| 7,206,805 B1 | 4/2007 | McLaughlin, Jr. | |
| 7,593,947 B2 * | 9/2009 | Nagai et al. | |
| 7,991,847 B2 * | 8/2011 | Cadoret et al. | 709/206 |
| 2003/0110230 A1 * | 6/2003 | Holdsworth et al. | 709/207 |
| 2003/0158883 A1 * | 8/2003 | Drudis et al. | 709/102 |
| 2004/0123015 A1 | 6/2004 | Durr et al. | |

(Continued)

FOREIGN PATENT DOCUMENTS

JP 04360265 A * 12/1992 ............. G06F 15/16

OTHER PUBLICATIONS

Wikipedia, "Hyper-threading", May 3, 2009, 4 pages.*

(Continued)

*Primary Examiner* — David J. Huisman
(74) *Attorney, Agent, or Firm* — Kunzler, PC

(57) ABSTRACT

A method, system, and apparatus are disclosed for processing serialized transactions in parallel while preserving transaction integrity. The method includes receiving a transaction comprising at least two keys and accessing a serialization-independent key ("SI-Key") and a serialization-dependent key ("SD-Key") from the transaction. A value for the SI-Key identifies the transaction as independent of transactions having a different value for the SI-Key. Furthermore, a value for the SD-Key governs a transaction execution order for each transaction having a SI-Key value that matches the SI-Key value associated with the SD-Key value. The method also includes assigning the transaction to an execution group based on a value for the SI-Key. The method also includes scheduling the one or more transactions in the execution group in an order defined by the SD-Key. The execution group may execute in parallel with one or more additional execution groups.

14 Claims, 6 Drawing Sheets

| $T_x$ | Description | Customer ID (SI-Key) | Timestamp (SD-Key) | Execution Group |
|---|---|---|---|---|
| $T_1$ | Deposit | 1 | 10:00:00 AM | A |
| $T_2$ | Withdrawal | 3 | 10:00:00 AM | B |
| $T_3$ | Transfer | 2 | 10:01:03 AM | C |
| $T_4$ | Deposit | 1 | 10:01:25 AM | A |
| $T_5$ | Transfer | 2 | 10:01:34 AM | C |
| $T_6$ | Transfer | 4 | 10:02:00 AM | D |
| $T_7$ | Withdrawal | 2 | 10:02:15 AM | C |
| $T_8$ | Withdrawal | 3 | 10:02:15 AM | B |
| $T_9$ | Deposit | 5 | 10:02:35 AM | E |
| $T_{10}$ | Withdrawal | 5 | 10:02:40 AM | E |
| $T_{11}$ | Withdrawal | 1 | 10:02:45 AM | A |
| $T_{12}$ | Transfer | 1 | 10:03:01 AM | A |
| $T_{13}$ | Transfer | 4 | 10:03:15 AM | D |
| $T_{14}$ | Deposit | 3 | 10:03:23 AM | B |

(56) References Cited

U.S. PATENT DOCUMENTS

| | | |
|---|---|---|
| 2005/0021745 A1 | 1/2005 | Bookman et al. |
| 2006/0155753 A1 | 7/2006 | Asher et al. |
| 2007/0118601 A1* | 5/2007 | Pacheco ........................ 709/206 |
| 2007/0244741 A1 | 10/2007 | Blume et al. |
| 2007/0288530 A1 | 12/2007 | Romem et al. |

OTHER PUBLICATIONS

Kaiser, Gail E., "Transactions for Concurrent Object-Oriented Programming Systems" Columbia University, Department of Computer Science, New York, NY, pp. 136-138, Apr. 1989.
Schwarz et al., "Transitive Dependencies in Transaction Closures" Otto-von-Guerike-University, Madgeburg, pp. 1-10, Jul. 1998.

* cited by examiner

SYSTEM AND METHOD FOR ASSIGNING A TRANSACTION TO A SERIALIZED EXECUTION GROUP BASED ON AN EXECUTION GROUP LIMIT FOR PARALLEL PROCESSING WITH OTHER EXECUTION GROUPS

BACKGROUND OF THE INVENTION

Field of the Invention

This invention relates to processing serialized transactions and more particularly relates to processing serialized transactions in parallel while preserving transaction integrity.

Description of the Related Art

The use of computing systems such as cloud, grid, cluster, and other related computing systems that provide large amounts of processing capacity are becoming increasingly more available to quickly process large amounts of data. The ideal data for processing by these parallel systems is often data that is divided and processed simultaneously in chunks. A large portion of business applications are "transaction processing" based and often, atomic transactions are "batched" together into larger units. However, a key characteristic of these batches of transactions is the need for serialization of the workload.

Serialized workloads do not trivially lend themselves to parallel processing algorithms because one transaction may depend on another transaction being executed in order. Thus, by default, serialized workloads often cannot take immediate advantage of the large quantity of non-scarce parallel computing resources available within a parallel processing computing system such as the cloud computing paradigm. Cloud computing makes large amounts of parallel computer resources available, and thus processing time can be reduced by several orders of magnitude. Nevertheless, if a large stream of transactions is serialized, the entire stream must be processed by a single processor stream, and thus fail to take advantage of other available processing resources.

SUMMARY OF THE INVENTION

The present invention has been developed for processing serialized transactions in parallel while preserving transaction integrity.

A method is presented for receiving a transaction, accessing a serialization-independent key ("SI-Key") and a serialization-dependent key ("SD-Key"), assigning the transaction to an execution group, and executing the one or more transactions in the execution group.

In one embodiment, the method includes receiving a transaction comprising at least two keys. The method may also include accessing an SI-Key and an SD-Key from the transaction. An SI-Key value identifies the transaction as independent of transactions having a different value for the SI-Key. Furthermore, an SD-Key value governs a transaction execution order for each transaction having an SI-Key value that matches the SI-Key value associated with the SD-Key value.

In another embodiment, the method may include assigning the transaction to an execution group based on a value for the SI-Key. In this embodiment, the execution group holds one or more transactions. The method may also include scheduling the one or more transactions in the execution group for execution in an order defined by the SD-Key. The execution group may execute in parallel with one or more additional execution groups.

In one embodiment, the method may include creating a new execution group in response to identifying a new value for the SI-Key. The new value includes a value unassociated with a value for an SI-Key of existing execution groups and the new execution group is associated with the new value for the SI-Key.

In one embodiment, the execution group is a hash map. Furthermore, in another embodiment, assigning the transaction further includes assigning the transaction to an execution group based on a compound attribute. The compound attribute may be based on a value for the SI-Key and a value for the SD-Key.

In some embodiments, the method further includes sorting the one or more transactions in each execution group based on each SD-Key value. In addition, receiving a transaction may include receiving the transaction as part of a transaction stream. The dependent key may be a timestamp and the SI-Key may be a unique entity identifier.

An apparatus is provided for processing serialized transactions in parallel while preserving transaction integrity. The apparatus includes modules that may functionally perform the necessary steps as described above in relation to the method. These modules in the described embodiments include a receiving module, an accessing module, an assignment module, and a scheduling module. In certain embodiments, the apparatus may also include a creation module and a sorting module. Furthermore, in one embodiment, the SD-Key includes a "nextID" auto-increment identifier.

A system of the present invention is also presented for processing serialized transactions in parallel while preserving transaction integrity. The system also includes modules that may functionally perform the necessary steps as described above in relation to the method and apparatus. The system may be embodied as an input device, a memory, a plurality of processors configured to process in parallel, and a bus coupling the input device, memory, and plurality of processors.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
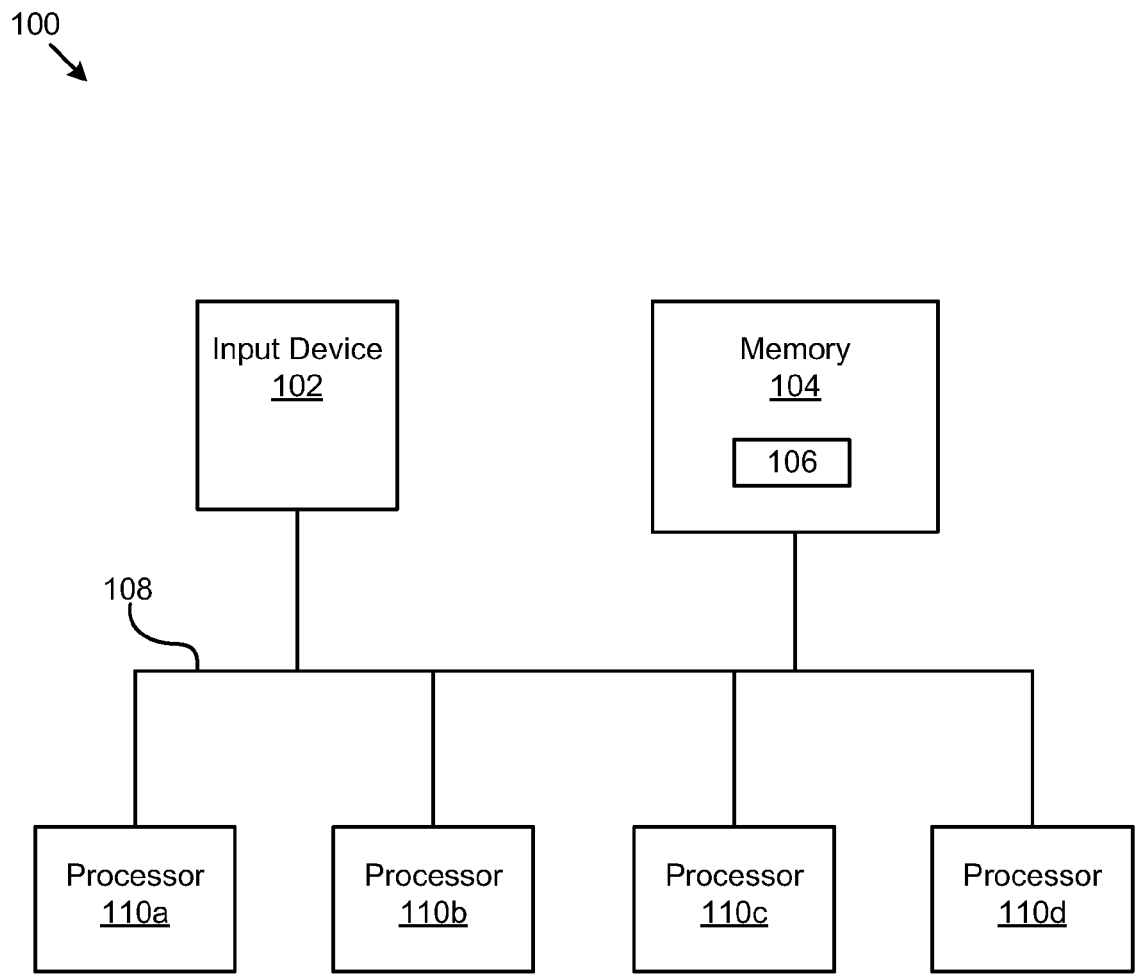
FIG. 1 is a schematic block diagram illustrating one embodiment of a system for processing serialized transactions in parallel while preserving transaction integrity.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or apparatus. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for processing serialized transactions in parallel while preserving transaction integrity. The system 100 includes an input device 102, a memory 104 comprising a transaction processing module 106, a plurality of processors 110a-d configured to process in parallel, and a system bus 108 coupling the input device 102, the memory 104, and the plurality of processors 110a-d. Those of skill in the art recognize that the system 100 may be simpler or more complex than illustrated, so long as the system 100 includes modules or sub-systems that correspond to those described herein.

The input device 102 may include a human input device such as a keyboard, pointing device, or touch screen. Furthermore, the input device may also include a network input, an electronic bus, or any other input device for receiving inputs from another device. The memory 104 may include a non-volatile storage device such as a hard disk drive or CD ROM drive, a read-only memory (ROM), and a random access volatile memory (RAM). Furthermore, the memory 104 stores a transaction processing module 106.

Given a stream of serialized transactions, certain subsets of the transactions are not serially dependent in relation to each other. Other subsets are serially dependent and a processor 110a must execute them in the proper order to maintain transactional integrity. Transactional integrity involves executing serialized transactions in a proper order so as to obtain an accurate result. For example, in certain banking transactions that involve a common client who deposited a sum of money and then withdrew a sum of money, the two transactions must be executed in the order of occurrence, the deposit and then the withdrawal. If the client lacked sufficient funds for the withdrawal before the deposit was made, reversing the order of the transactions would result in a inaccurate negative balance in the account. The serially dependent subsets are often interleaved with other non-related subsets and are not necessarily contiguous.

Therefore, even though a stream of serialized transactions may include subsets of transactions that are not serially dependent on other subsets, the entire stream is typically executed serially.

However, the transaction processing module 106 divides the serialized transactions into execution groups, with the transactions that are serially dependent on each other in a common group. Each processor 110a-d executes each execution group independently from the other execution groups. Consequently, the transaction processing module 106 executes a serialized batch of transactions in an execution group in parallel with another serialized batch of transactions in a different execution group, thus shortening the overall time to process the transactions. The magnitude of the time reduction can be quite large, depending on available parallel computing resources. Cloud computing or distributed computing makes large amounts of parallel computing resources available, thus reducing execution time by several orders of magnitude. Therefore, the transaction processing module 106 is able to divide an otherwise undividable serialized transaction stream for more efficient processing.

The system bus 108 may operably interconnect the input device 102, memory 104, and the plurality of processors 110a-d. The plurality of processors 110a-d may reside in the same device as the memory 104 or may reside in one or more additional devices connected by a communication media such as a network, bus, or direct cable connection.

Figure 2:
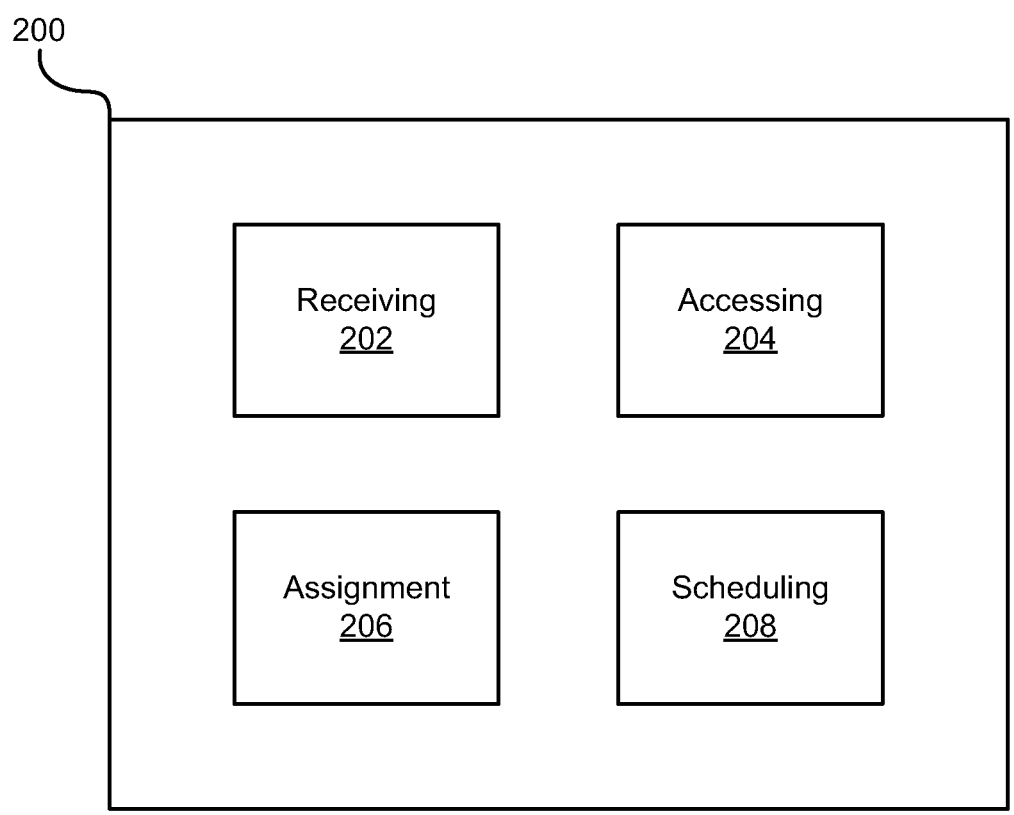
FIG. 2 is a schematic block diagram illustrating one embodiment of an apparatus for processing serialized transactions in parallel while preserving transaction integrity.

FIG. 2 illustrates one embodiment of an apparatus 200 for processing serialized transactions in parallel while preserving transaction integrity. The apparatus 200 depicts one embodiment of the transaction processing module 106 and includes a receiving module 202, an accessing module 204, an assignment module 206, and a scheduling module 208.

The receiving module 202 receives a plurality of serialized transactions. The receiving module 202 may receive the plurality of serialized transactions from the input device 102 in the form of a transaction stream. The serialized transaction stream may include bank transactions, database transactions, or other serialized transactions that require some form of processing. In one embodiment, each serialized transaction includes at least two data fields. For example, in a serialized transaction stream from a bank, each bank transaction may include a CustomerID field to identify the customer, an Action field to identify the purpose of the transaction such as a withdrawal or deposit, an Amount field with a dollar amount, and a TimeStamp field with the time of the transaction. In one embodiment, each transaction includes two or more keys. A key is a data field that the transaction processing module 106 may use to group and sort the transactions.

The accessing module 204 accesses a serialization-independent key ("SI-Key") and a serialization-dependent key ("SD-Key") from the plurality of serialized transactions. In one embodiment, each value for the SI-Key identifies the transaction as independent of transactions having a different value for the SI-Key. For example, a customer identification, or CustomerID in the bank transaction may be an SI-Key because a transaction with a CustomerID having a first value is independent of transactions having a CustomerID with a second value. The CustomerID field does not relate to execution order. A processor 110a does not need to execute a transaction with a CustomerID of 1 before a transaction with a CustomerID of 2 based on the value of the CustomerID alone. Furthermore, a withdrawal from Customer 1 will not affect a transaction for Customer 2.

The independent key may be a unique entity identifier such as CustomerID or a customer identification number. A unique entity identifier is an identifier that has a unique value for each distinct entity the identifier represents, and a common value for entries from the same entity. Therefore, a CustomerID may be a unique entity identifier because the CustomerID has the same value for transactions originating from a common customer, and a different value for transactions originating from another customer.

Each value for the SD-Key governs a transaction execution order for each transaction having an SI-Key value that matches the SI-Key value associated with the SD-Key value. One of ordinary skill in the art realizes that an SD-Key may be any data field holding values that require execution in a certain order such as a transaction number or a timestamp. Another example of an SD-Key is a "nextID" auto-increment identifier generated by many database applications that is incremented and assigned to each transaction or database entry.

For example, transaction A has a timestamp indicating that the transaction occurred earlier in time than Transaction B. A processor 110a must often execute Transaction A before Transaction B because the result of Transaction A may influence the outcome of Transaction B if Transaction A and Transaction B belong to the same serializable group. Therefore, a processor 110a must execute transactions with the same SI-Key in an order defined by the SD-Key to maintain transactional integrity as described above. For example, a withdrawal from Customer 1 will not affect a subsequent transaction by Customer 2. Therefore, a processor 110a may execute the transactions of Customer 1 in any order in relation to the transactions of Customer 2. However, a withdrawal by Customer 1 will affect a subsequent transaction by Customer 1.

In one embodiment, the accessing module 204 accesses the SI-Key and SD-Key based on keys predefined by the user. A user may define the data fields for the SI-Key and SD-Key based on the nature of the transactions. Furthermore, the user may define the data field for the SI-Key and the data field for the SD-Key in a set of predefined key requirements for reference by the accessing module 204. In one embodiment, the predefined key requirements list several possible data fields for the accessing module to use as keys. In addition, one of ordinary skill in the art realizes that other methods, such as automatic methods, may be used by the accessing module 204 to identify or access keys in a transaction stream.

The assignment module 206 creates one or more execution groups and assigns each transaction to one of the one or more execution groups based on the value for the SI-Key in each transaction. Each execution group may hold one or more transactions. Furthermore, the assignment module 206 may assign transactions to execution groups based on user preference or on system performance and processor availability.

For example, in one embodiment, the assignment module 206 assigns transactions with a first value for the SI-Key to a first execution group and transactions with a second value for the SI-Key to a second execution group. In this embodiment, a distinct execution group exists for each SI-Key value. If a user has limited the number of execution groups for use by the assignment module 206 or if the number of processors 110a-d is limited, the assignment module 206 may assign transactions with different values for the SI-Key to the same execution group. Therefore, in another embodiment, the assignment module 206 assigns transactions with a first value for the SI-Key and transactions with a second value for the SI-Key to a first execution group and assigns transactions with a third value for the SI-Key and a fourth value for the SI-Key to a second execution group. Therefore, a single execution group may hold transactions with different SI-Key values.

In one embodiment, the execution group is a hash map using the SI-Key values as keys for the hash map. The assignment module 206 groups each transaction into one of a number of parallel hash maps depending on the value of the SI-Key for the transaction.

In another embodiment, the assignment module 206 assigns the transaction to an execution group based on a compound attribute. The compound attribute is based on a value for the SI-Key and a value for an additional data field. For example, an execution group may comprise transactions with a common SI-Key combined with a zip code data field in the transactions. This may be useful to subdivide the execution groups based on geographic location for entities with offices in many locations. One of ordinary skill in the art realizes that the assignment module 206 may use many different data fields for the compound attribute to form various divisions of execution groups. By using a compound attribute, the assignment module 206 may further subdivide the transactions and is not limited to grouping the transactions based on the SI-Keys alone.

The scheduling module 208 schedules the one or more transactions in each execution group for execution in an order defined by the SD-Key. Each execution group executes on a processor 110a in parallel with one or more additional execution groups on one or more additional processors 110b-d. As mentioned above, a processor 110a may execute transactions with a particular SI-Key value without regard to order in relation to transactions with a different SI-Key value. Therefore, the scheduling module 208 may schedule an execution group for a processor 110a to execute in parallel with execution groups executing on other processors 110b-d without affecting the results of the transactions in each execution group and maintaining transactional integrity. However, within each execution group, the scheduling module 208 schedules the transactions to be executed by a processor 110a in order based on each value for the SD-Key. For example, if the SD-Key is a timestamp, the scheduling module 208 schedules the transactions in each execution group to be executed by a processor 110a in order from the earliest timestamp to the latest.

Scheduling the execution groups to execute in parallel results in a decrease of overall execution time for the transaction workload. Furthermore, the scheduling module 208 may utilize computing environments with large amounts of available parallel computing resources such as a cloud computing system or a distributed computing system.

Figure 3:
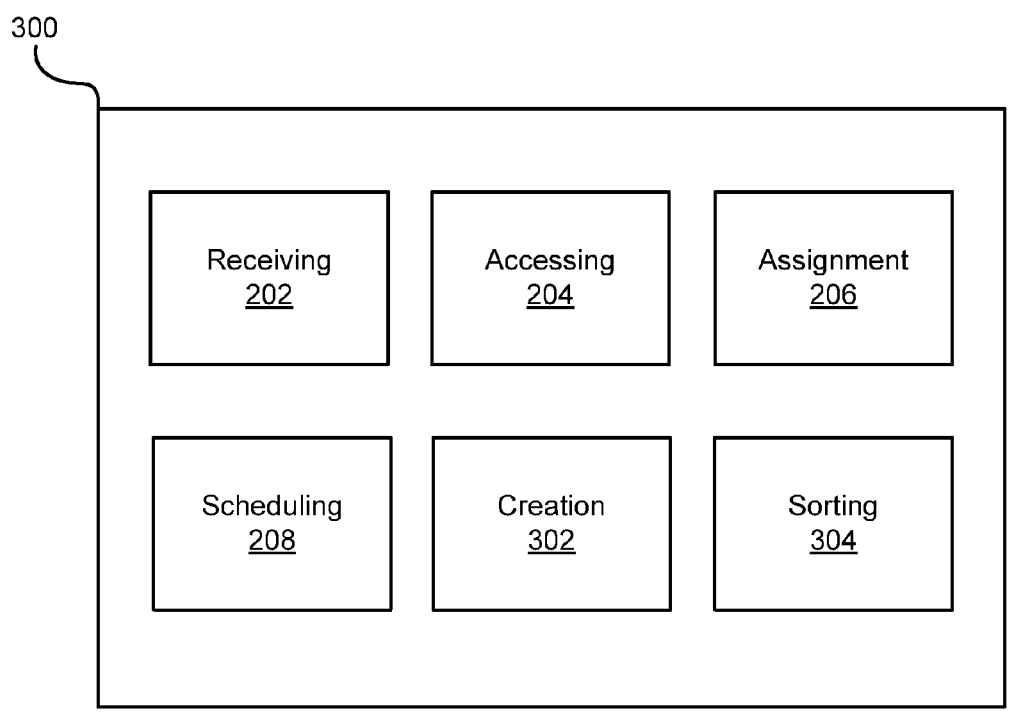
FIG. 3 is a detailed schematic block diagram illustrating one embodiment of an apparatus for processing serialized transactions in parallel while preserving transaction integrity.

FIG. 3 illustrates another embodiment of an apparatus 300 for processing serialized transactions in parallel while preserving transaction integrity. The apparatus 300 includes the receiving module 202, the accessing module 204, the assignment module 206, and the scheduling module 208, wherein these modules include substantially the same features as described above in relation to FIG. 2. Additionally, in one embodiment, the apparatus 300 includes a creation module 302 and a sorting module 304.

The creation module 302 creates a new execution group in response to identifying a new value for the SI-Key. The new value is a value unassociated with the values for SI-Keys in existing execution groups. The new execution group is associated with the new value for the SI-Key. For example, if the creation module 302 determines that an execution group does not exist for the independent key value of CustomerID equal to 1, the creation module 302 creates a new execution group for transactions that have a value for the CustomerID equal to 1.

In one embodiment, the creation module 302 creates execution groups for every distinct SI-Key value. In another embodiment, the creation module 302 creates new execution groups until reaching an execution group limit. A user/operator may predefine the execution group limit. In addition, the execution group limit may be automatically determined by the creation module 302 based on the number of available processors 110a-d, system resources of the executing system, and the like. In some embodiments, the creation module 302 determines an optimal number of execution groups to maximize performance and minimize execution time.

The sorting module 304 sorts a plurality of transactions in each execution group based on the SD-Key. In certain embodiments, the received transactions are not in order based on the SD-Key. Therefore, the sorting module 304 sorts the transactions to ensure data integrity. In one embodiment, the sorting module 304 sorts the transactions based on two or more SD-Keys. For example, the sorting module 304 may sort transactions in one execution group based on a batch number and a timestamp. In another embodiment, if two or more SI-Keys are assigned to a single execution group, the sorting module 304 first sorts by the SI-Key, then orders by the SD-Key.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Figure 4:
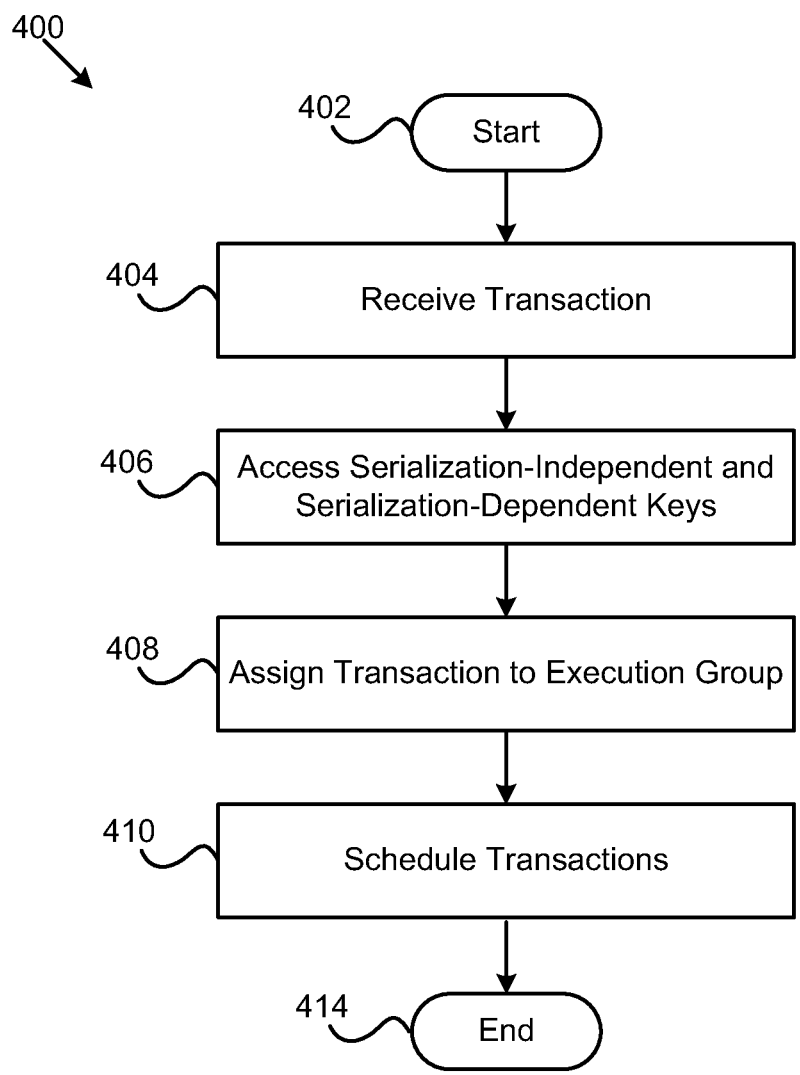
FIG. 4 a schematic flow chart diagram illustrating one embodiment of a method for processing serialized transactions in parallel while preserving transaction integrity.

FIG. 4 illustrates one embodiment of a method 400 for processing serialized transactions in parallel while preserving transaction integrity. The method 400 starts 402 when the receiving module 202 receives 404 a plurality of transactions with each transaction including two or more keys. Next, the accessing module 204 identifies 406 an SI-Key independent of transaction order in relation to another transaction, and an SD-Key governing transaction execution order in relation to another transaction.

The assignment module 206 then assigns 408 each transaction to one of one or more execution groups based on a value for the SI-Key in each transaction. Finally, the scheduling module 208 schedules 410 the one or more transactions in each execution group for execution in an order defined by the SD-Key. Furthermore, the scheduling module 208 executes each execution group in parallel with one or more additional execution groups. Then the method 400 ends 414.

Figure 5:
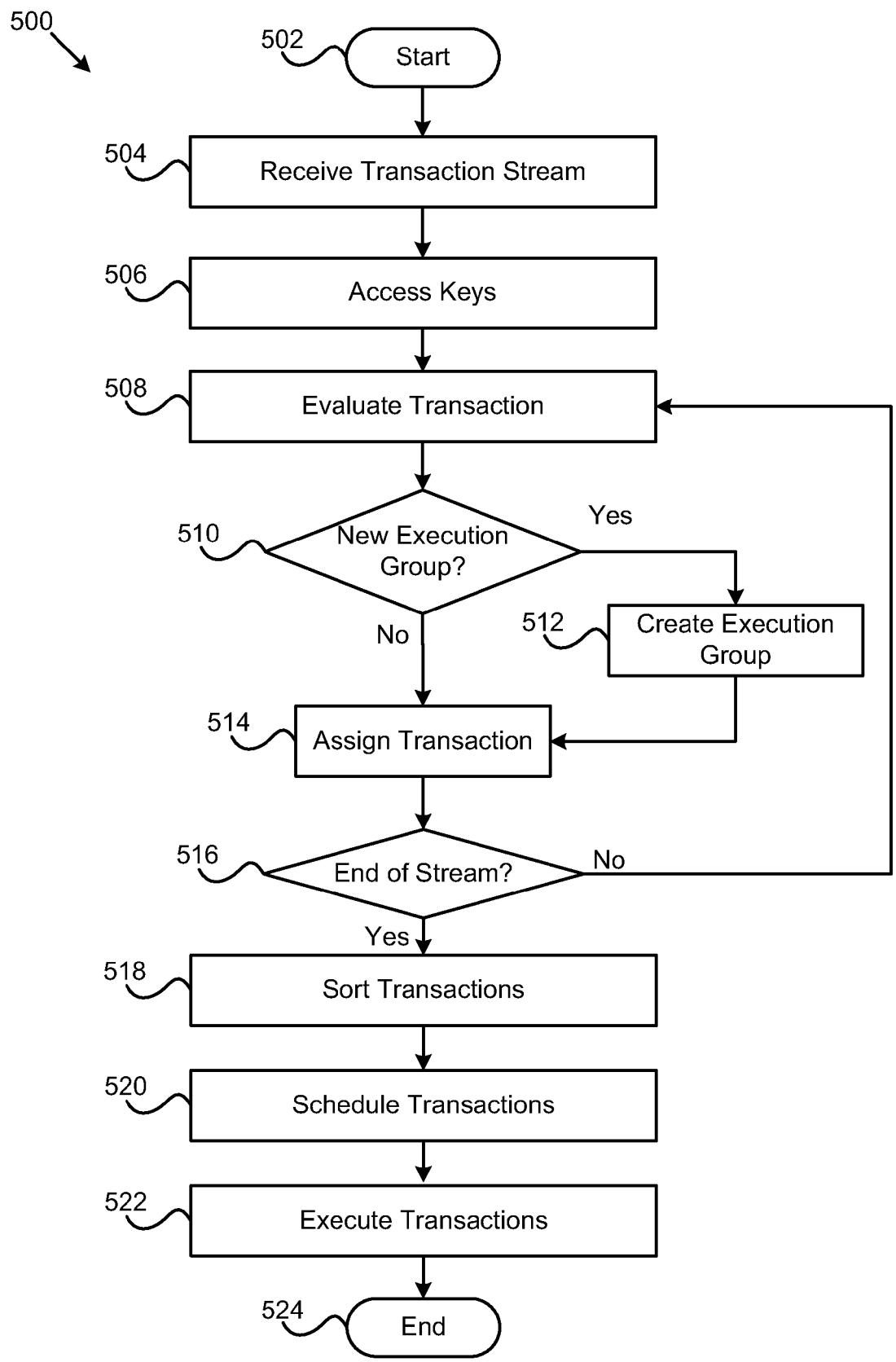
FIG. 5 is a detailed schematic flow chart diagram illustrating one embodiment of a method for processing serialized transactions in parallel while preserving transaction integrity.

FIG. 5 illustrates a detailed embodiment of a method 500 for processing serialized transactions in parallel while preserving transaction integrity. First, the method 500 starts 502 when the receiving module 202 receives 504 a transaction stream through the input device. The transaction stream comprises a plurality of transactions, each transaction including two or more keys. Next, the accessing module 204 identifies 506 an SI-Key and an SD-Key from the plurality of transactions. The accessing module 204 may use user-defined data fields as keys or may select the SI-Key and SD-Key from the predefined key requirements.

The assignment module 206 then evaluates 508 each transaction. The creation module 302 determines 510 that the transaction has a new value for the SI-Key, or an SI-Key value that is not associated with any other execution groups, and the creation module 302 creates 512 a new execution group associated with that value. The assignment module 206 then assigns 514 the transaction to the new execution group.

Alternatively, the creation module 302 determines 510 that the value for the SI-Key in the transaction is already represented in an execution group or that the number of execution groups equals an execution group limit. Therefore, the assignment module 206 assigns 514 the transaction to an existing execution group and the creation module 302 does not create a new execution group.

Next, the receiving module 202 determines 516 that the transaction stream includes another transaction and the method repeats the steps beginning with the evaluating 508 step. Alternatively, the receiving module 202 determines 516 that the stream has ended. The sorting module 304 sorts 518 the transactions in each execution group based on the SD-Key. The scheduling module 208 schedules 520 the transactions in each execution group for execution in parallel on a plurality of processors 110 a-d. Finally, the plurality of processors 110a-d executes 522 the transactions in each execution group. Then, the method 500 ends 524.

Figure 6:
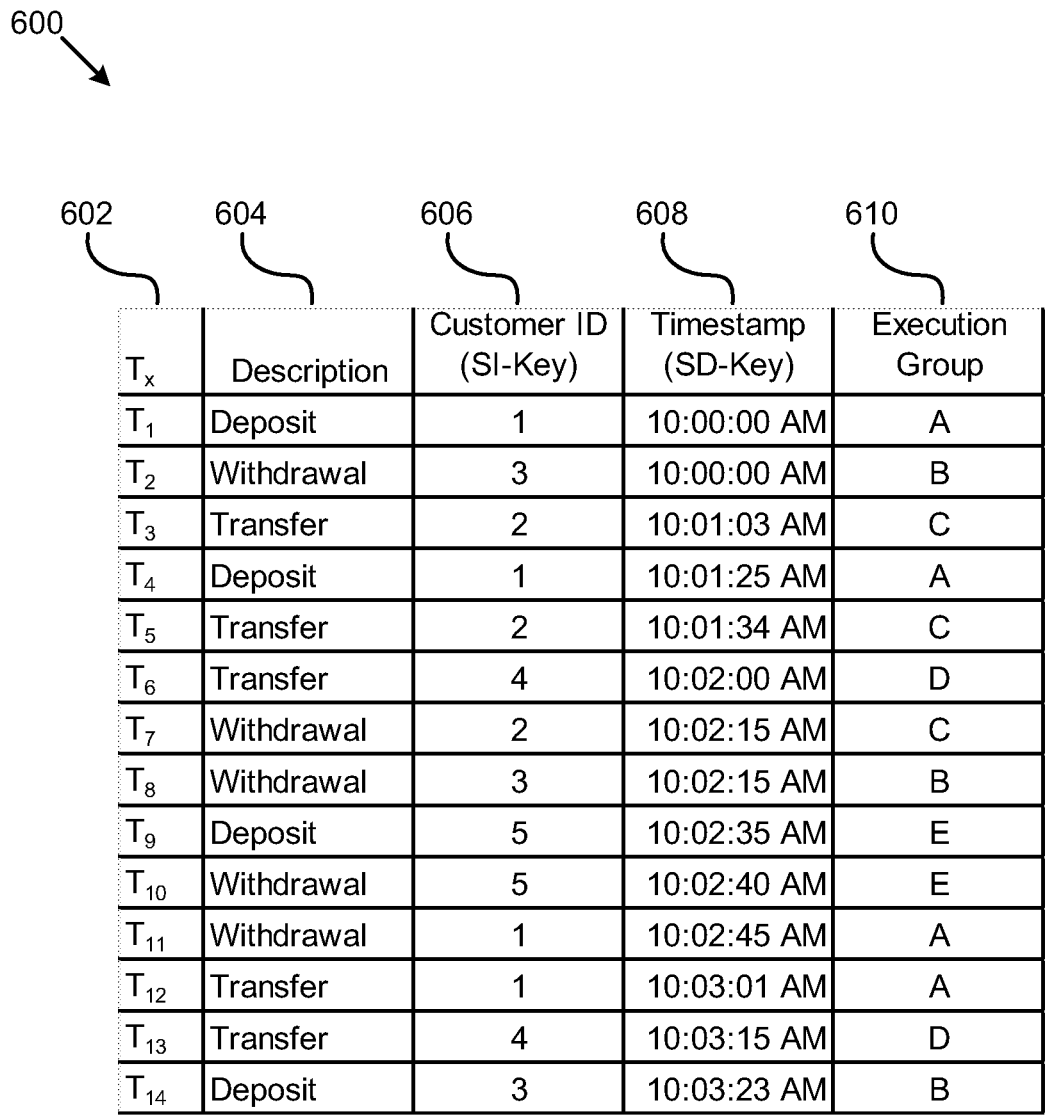
FIG. 6 is an example table with transactions from a transaction stream illustrating data fields and keys of each transaction.

FIG. 6 is an example table 600 with transactions from a transaction stream. The table 600 illustrates data fields and keys of each transaction. The table 600 lists fourteen sample transactions. The first column 602 identifies the transaction. The next column 604 describes the transaction with classifications/descriptions such as "deposit," "withdrawal," or "transfer." The next column 606 includes the CustomerID field which will serve as the SI-Key. The next column 608 includes a timestamp of when the transaction occurred and will serve as the SD-Key. The final column 610 includes the execution group to which the transaction $T_x$ is assigned.

$T_1$, $T_4$, $T_{11}$, and $T_{12}$ are assigned to Execution Group A because each of these transactions share a common SI-Key 606, a CustomerID of 1. Therefore, these four transactions originate from the same customer and can be executed in order to ensure that data integrity is preserved. Consequently, the scheduling module 208 may schedule the transactions $T_1$, $T_4$, $T_{11}$, and $T_{12}$ to be executed in order based on the SD-Key timestamp 608 with the earliest transactions executed first. Thus, the two deposits ($T_1$ and $T_4$) from the customer will be correctly executed before the withdrawal ($T_{11}$) and transfer ($T_{12}$).

Similarly, $T_2$, $T_8$, and $T_{14}$ are assigned to Execution Group B because these transactions have the SI-Key 606 with a CustomerID of 3. The transactions in Execution Group B may be executed in parallel with the transactions in Execution Group A because the transactions in each group belong to different customers and are not serialization dependent on each other.

Transactions $T_3$, $T_5$, and $T_7$ have been assigned to Execution Group C based on their SI-Key 606 values. The transactions in Execution Group C may also be executed in parallel with transactions from Execution Group A and Execution Group B.

Likewise, $T_6$ and $T_{13}$ have been assigned to Execution Group D and $T_9$ and $T_{10}$ have been assigned to Execution Group E. In the example table 600, the timestamps 608 for $T_1$ and $T_2$ are identical. However, $T_1$ and $T_2$ are assigned to different execution groups 610 and will be executed independent of one another. Therefore, two transactions may have identical SD-Key 608 values if the transactions have distinct SI-Key 606 values.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   in response to receiving a transaction, accessing, by use of at least one processor, a transaction serialization-independent key (SI-Key) and a predefined transaction serialization-dependent key (SD-Key) of the received transaction;
   in response to a determination that an existing execution group of a plurality of execution groups is not associated with the transaction SI-Key and an execution group limit is reached, assigning the received transaction to the existing execution group; and
   in response to a determination that the existing execution group is not associated with the transaction SI-key and the execution group limit is not reached, assigning the received transaction to a new execution group;
   wherein a plurality of transactions assigned to any execution group of the plurality of execution groups are executed serially in an order based on transaction SD-Keys; and
   wherein the plurality of transactions assigned to any execution group of the plurality of execution groups are executed in parallel with transactions assigned to other execution groups.

2. The method of claim 1, wherein assigning the received transaction to the new execution group further comprises assigning the received transaction to the new execution group based on a compound attribute, the compound attribute based on the transaction SI-Key and an additional data field.

3. The method of claim 1, further comprising scheduling one or more transactions in the new execution group for execution.

4. The method of claim 1, wherein the new execution group comprises a hash map.

5. The method of claim 1, further comprising sorting transactions in the execution group that comprises the received transaction based on predefined transaction SD-Keys.

6. The method of claim 1, wherein the transaction SI-Key comprises a unique entity identifier and the execution group limit is predefined to decrease execution time.

7. An apparatus comprising:
a non-transitory computer readable storage medium storing computer readable program code executable by a processor to:
in response to receiving a transaction from a set of serialized transactions, access a transaction serialization-independent key (SI-Key) and a predefined transaction serialization-dependent key (SD-Key) of the received transaction;
in response to a determination that an existing execution group is not associated with the transaction SI-Key and an execution group limit is reached, assign the received transaction to the existing execution group; and
in response to a determination that the existing execution group is not associated with the transaction SI-key and the execution group limit is not reached, assign the received transaction to a new execution group;
wherein a plurality of transactions assigned to any execution group of a plurality of execution groups are executed serially in an order based on transaction SD-Keys; and
wherein the plurality of transactions assigned to any execution group of the plurality of execution groups are executed in parallel with transactions assigned to other execution groups.

8. The apparatus of claim 7, wherein the processor further assigns the received transaction to the new execution group based on a compound attribute, the compound attribute based on the transaction SI-Key and an additional data field.

9. The apparatus of claim 7, wherein the processor further sorts transactions in the new execution group based on predefined transaction SD-Keys.

10. The apparatus of claim 7, wherein the received transaction is part of a transaction stream comprising the set of serialized transactions.

11. The apparatus of claim 7, wherein the transaction SI-Key comprises a unique entity identifier and the execution group limit is predefined to decrease execution time.

12. A system comprising:
an input device;
a plurality of processors configured to process in parallel;
a bus coupling the input device, a memory, and the plurality of processors; and
the memory, the memory storing computer readable program code executable by the plurality of processors to:
in response to receiving a transaction, access a transaction serialization-independent key (SI-Key) and a predefined transaction serialization-dependent key (SD-Key) of the received transaction;
in response to a determination that an existing execution group is not associated with the transaction SI-Key and an execution group limit is reached, assign the received transaction to the existing execution group; and
in response to a determination that the existing execution group is not associated with the transaction SI-key and the execution group limit is not reached, assign the received transaction to a new execution group;
wherein a plurality of transactions assigned to any execution group of a plurality of execution groups are executed serially in an order based on transaction SD-Keys; and
wherein the plurality of transactions assigned to any execution group of the plurality of execution groups are executed in parallel with transactions assigned to other execution groups.

13. The system of claim 12, wherein the plurality of processors further assigns the received transaction to the new execution group based on a compound attribute, the compound attribute based on the transaction SI-Key and an additional data field.

14. The system of claim 12, wherein the transaction SI-Key comprises a unique entity identifier and the execution group limit is predefined to decrease execution time.

* * * * *